US010833551B2

(12) United States Patent
Yamazaki et al.

(10) Patent No.: US 10,833,551 B2
(45) Date of Patent: Nov. 10, 2020

(54) STATOR OF ROTATING ELECTRICAL MACHINE

(71) Applicant: Hitachi Automotive Systems, Ltd., Hitachinaka-shi, Ibaraki (JP)

(72) Inventors: Shinji Yamazaki, Hitachinaka (JP); Kenichi Nakayama, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/302,134

(22) PCT Filed: Jun. 7, 2017

(86) PCT No.: PCT/JP2017/021077
§ 371 (c)(1),
(2) Date: Nov. 16, 2018

(87) PCT Pub. No.: WO2018/003436
PCT Pub. Date: Jan. 4, 2018

(65) Prior Publication Data
US 2019/0312480 A1    Oct. 10, 2019

(30) Foreign Application Priority Data

Jun. 28, 2016 (JP) ................. 2016-127458

(51) Int. Cl.
*H02K 3/34* (2006.01)
*H02K 1/16* (2006.01)
(Continued)

(52) U.S. Cl.
CPC ............. *H02K 3/345* (2013.01); *H02K 1/165* (2013.01); *H02K 3/12* (2013.01); *H02K 3/34* (2013.01); *H02K 3/48* (2013.01); *Y02T 10/64* (2013.01)

(58) Field of Classification Search
CPC .. H02K 3/34; H02K 1/16; H02K 3/12; H02K 3/48; H02K 3/345; H02K 1/165; Y02T 10/641
(Continued)

(56) References Cited

U.S. PATENT DOCUMENTS 3,334,255 A * 8/1967 Peters ................... H02K 3/345
310/215
8,446,061 B2 * 5/2013 Nakayama ............. H02K 3/345
310/214
(Continued)

FOREIGN PATENT DOCUMENTS

CN      102474146 A    5/2012
JP      58-193840 U    12/1983
(Continued)

OTHER PUBLICATIONS

International Search Report (PCT/ISA/210) issued in PCT Application No. PCT/JP2017/021077 dated Aug. 15, 2017 with English translation (five (5) pages).
(Continued)

*Primary Examiner* — Naishadh N Desai
(74) *Attorney, Agent, or Firm* — Crowell & Moring LLP

(57) ABSTRACT

A stator of a rotating electrical machine that can realize productivity growth, compared with a conventional technique is provided. A stator of a rotating electrical machine includes a slot; a plurality of coils disposed within the slot; and an insulator disposed around the coils within the slot. The insulator has an outer peripheral portion that surrounds the plurality of coils; and a bent portion that extends from the outer peripheral portion between the coils and that is folded back on a tip end.

5 Claims, 10 Drawing Sheets

(51) Int. Cl.
  *H02K 3/12*     (2006.01)
  *H02K 3/48*     (2006.01)

(58) Field of Classification Search
  USPC .................................................. 310/215, 214
  See application file for complete search history.

(56) References Cited

U.S. PATENT DOCUMENTS

| | | | |
|---|---|---|---|
| 10,432,053 B2* | 10/2019 | Tamura .................... | H02K 3/34 |
| 2004/0189134 A1* | 9/2004 | Onishi .................... | H02K 3/345 |
| | | | 310/215 |
| 2011/0050026 A1* | 3/2011 | Kaiser .................... | H02K 3/345 |
| | | | 310/215 |
| 2011/0163625 A1* | 7/2011 | Fukushima .............. | H02K 3/12 |
| | | | 310/198 |
| 2011/0204742 A1* | 8/2011 | Nakayama ............... | H02K 3/34 |
| | | | 310/215 |
| 2012/0080976 A1* | 4/2012 | Oka ....................... | H02K 3/325 |
| | | | 310/215 |

FOREIGN PATENT DOCUMENTS

| | | |
|---|---|---|
| JP | 61-285045 A | 12/1986 |
| JP | 4-210746 A | 7/1992 |
| JP | 2009-195009 A | 8/2009 |
| JP | 2012-147674 A | 8/2012 |
| JP | 2014-14204 A | 1/2014 |
| JP | 2014-166039 A | 9/2014 |
| JP | 2015-89243 A | 5/2015 |
| WO | WO 2011/013273 A1 | 2/2011 |

OTHER PUBLICATIONS

Japanese-language Written Opinion (PCT/ISA/237) issued in PCT Application No. PCT/JP2017/021077 dated Aug. 15, 2017 (three (3) pages).

Japanese-language Office Action issued in counterpart Japanese Application No. 2018-524999 dated Dec. 18, 2019 with English translation (nine (9) pages).

Chinese-language Office Action issued in Chinese Application No. 201780029533.4 dated Mar. 23, 2020 with English translation (13 pages).

* cited by examiner

STATOR OF ROTATING ELECTRICAL MACHINE

TECHNICAL FIELD

The present invention relates to a stator of a rotating electrical machine.

BACKGROUND ART

Inventions regarding a rotating electrical machine that has a stator and a rotor have been conventionally known (refer to Patent Document 1 below). In the conventional rotating electrical machine of this type, the stator is configured such that an insulator insulates conducting coils that are loaded into each slot to be stacked in a radial direction from each other and also insulates the slot from the conducting coils. The rotor is provided rotatably with respect to the stator via a predetermined gap (refer to Patent Document 1, claim 1 and the like).

Furthermore, the stator is provided with the insulator in such a manner as to be sandwiched between the first conducting coil and the second conducting coil adjacent to the first conducting coil within the same slot. This insulator is provided around the first conducting coil, and fixed so that an end portion of the insulator is sandwiched between one of surfaces of the insulator and the first conducting coil in a sandwiched part. Furthermore, this insulator is provided around a circumference of the second conducting coil in the same direction as that of an insulator part provided around the first conducting coil, and is fixed so that an end portion of the insulator is sandwiched between the other surface of the insulator and the second conducting coil in the sandwiched part.

PRIOR ART DOCUMENT

Patent Document

Patent Document 1: JP-2009-195009-A

SUMMARY OF THE INVENTION

Problem to be Solved by the Invention

According to the conventional invention, it is possible to obtain the rotating electrical machine provided with the insulator suited for insulating the conducting coils (refer to Patent Document 1, paragraph 0011 and the like). However, this conventional stator of the rotating electrical machine is susceptible to improvement in terms of productivity growth since interference tends to occur between the coils and the insulator in processes of accommodating the insulator in each slot and then disposing the coils in the slot.

The present invention has been achieved in view of the problems and an object of the present invention is to provide a stator of a rotating electrical machine that can realize productivity growth, compared with the conventional technique.

Means for Solving the Problem

To attain the object, a stator of a rotating electrical machine according to the present invention is a stator of a rotating electrical machine including: a slot; a plurality of coils disposed within the slot; and an insulator disposed around the coils within the slot. The insulator has an outer peripheral portion that surrounds the plurality of coils; and a bent portion that extends from the outer peripheral portion between the coils and that is folded back on a tip end.

Effect of the Invention

According to the stator of the rotating electrical machine of the present invention, disposing the insulator configured simply by being formed by bending a sheet-like insulator in the slot makes it possible to define a plurality of cylindrical spaces stable in shape by the bent portions stable in shape by being bent and the outer peripheral portion around the bent portion. In addition, it is possible to easily insert the plurality of coils into the plurality of cylindrical spaces stable in shape and easily insulate the slot from the coils and insulate the coils from each other. Therefore, according to the present invention, it is possible to provide the stator of the rotating electrical machine that can realize productivity growth, compared with the conventional technique.

MODES FOR CARRYING OUT THE INVENTION

Embodiments of a stator 30 of a rotating electrical machine 100 according to the present invention will be described hereinafter with reference to the drawings.

First Embodiment

Figure 1:
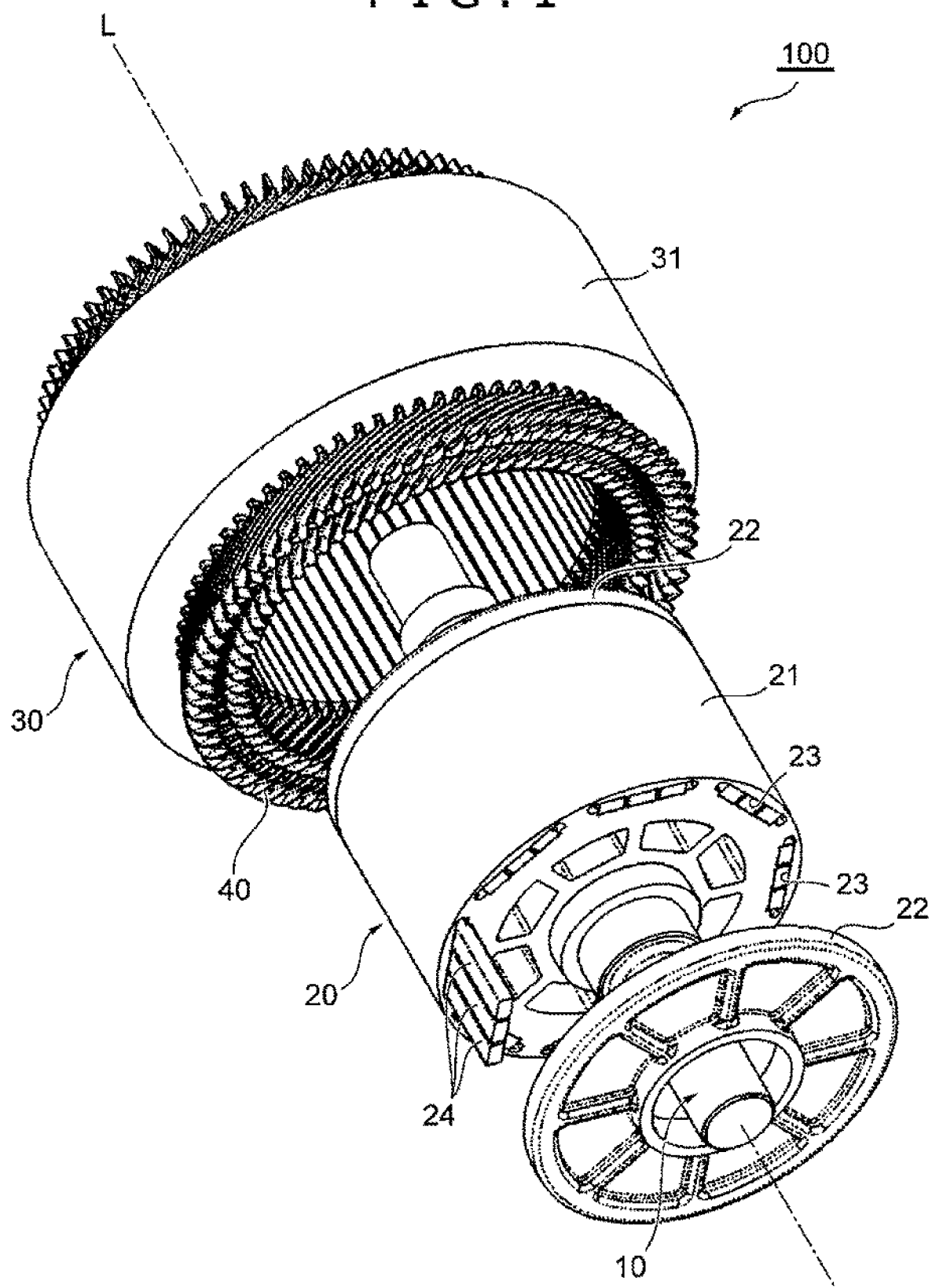
FIG. 1 is an exploded perspective view of a rotating electrical machine provided with a stator according to a first embodiment of the present invention.

FIG. 1 is an exploded perspective view of the rotating electrical machine 100 provided with the stator 30 according to a first embodiment of the present invention.

The rotating electrical machine 100 includes, for example, a shaft 10, a rotor 20 fixed to the shaft 10, and the stator 30 disposed around the rotor 20. The rotating electrical machine 100 is mounted in a vehicle, for example, a hybrid vehicle or an electric-powered vehicle, has both a function as a motor to which electric power is supplied and which rotates the shaft 10 and a function as a generator which generates electric power by rotation of the shaft 10, and can use each function by switching over between the two functions depending on a running condition of the vehicle.

The shaft 10 is a rod-like member that penetrates a center of the cylindrical rotor 20 in an axis L direction of the rotor 20, is fixed to the rotor 20, and rotates integrally with the rotor 20 about the axis L of the rotor 20. The rotor 20 has a cylindrical iron core 21 formed from a magnetic material, and end rings 22 fixed to two end portions of the iron core 21 in the axis L direction and formed from a non-magnetic material.

The iron core 21 of the rotor 20 is configured by, for example, stacking a plurality of flat rolled magnetic steel sheets in the axis L direction. As the flat rolled magnetic steel sheet configuring the iron core 21 of the rotor 20, a flat rolled magnetic steel sheet obtained by machining a flat rolled magnetic steel sheet at a thickness of, for example, approximately 0.05 to 1 mm into a predetermined shape by punching or etching can be used. The iron core 21 of the rotor 20 includes a plurality of magnet insertion holes 23 disposed at equiangular intervals in a circumferential direction and extending in the axis L direction, and a plurality of magnets 24 inserted into the magnet insertion holes 23. A resin material serving as an adhesive for fixing each magnet 24 to the magnet insertion hole 23 is filled between the magnet insertion hole 23 and the magnet 24.

Figure 2:
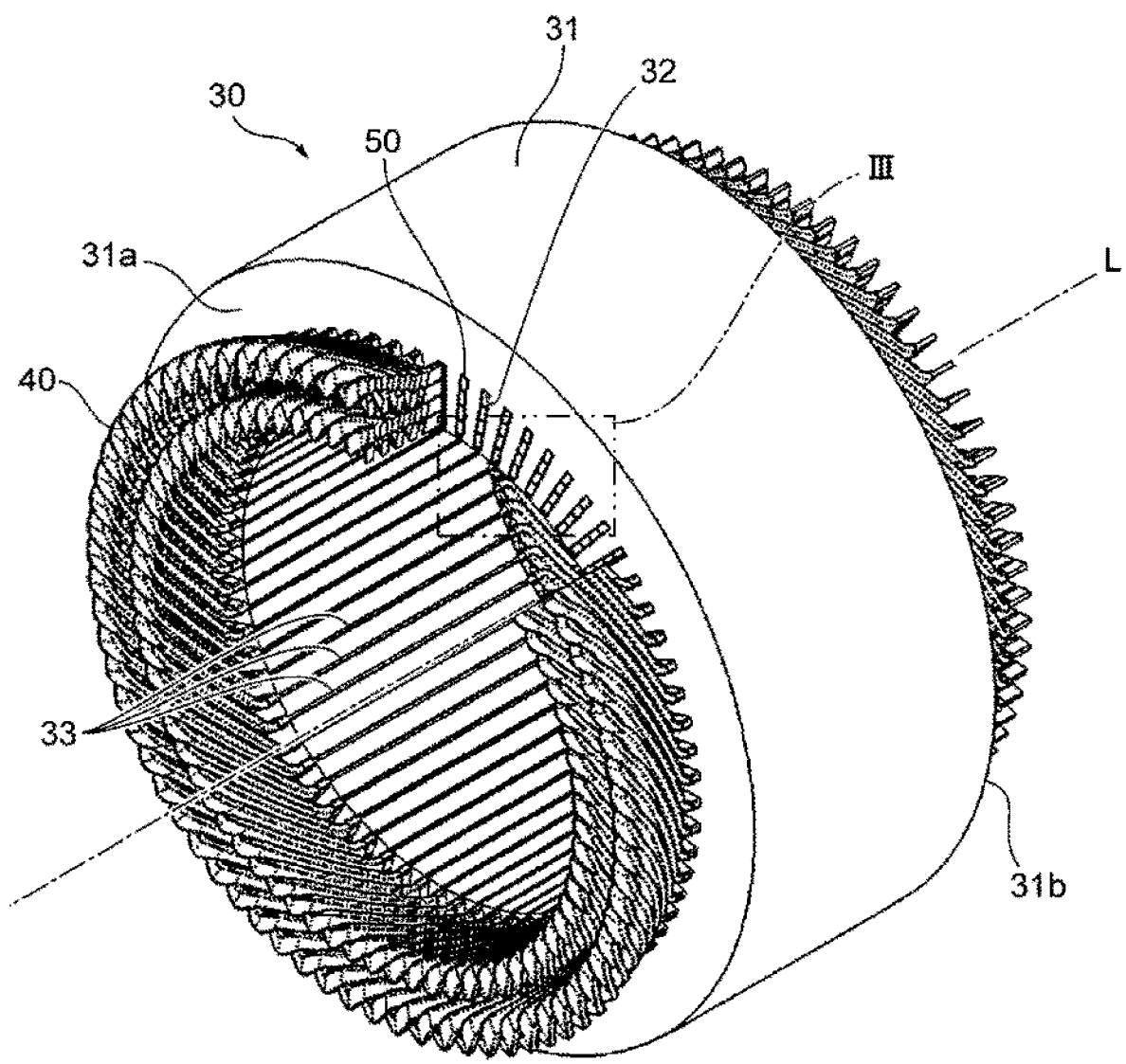
FIG. 2 is a perspective view of the stator of the rotating electrical machine illustrated in FIG. 1.
Figure 3:
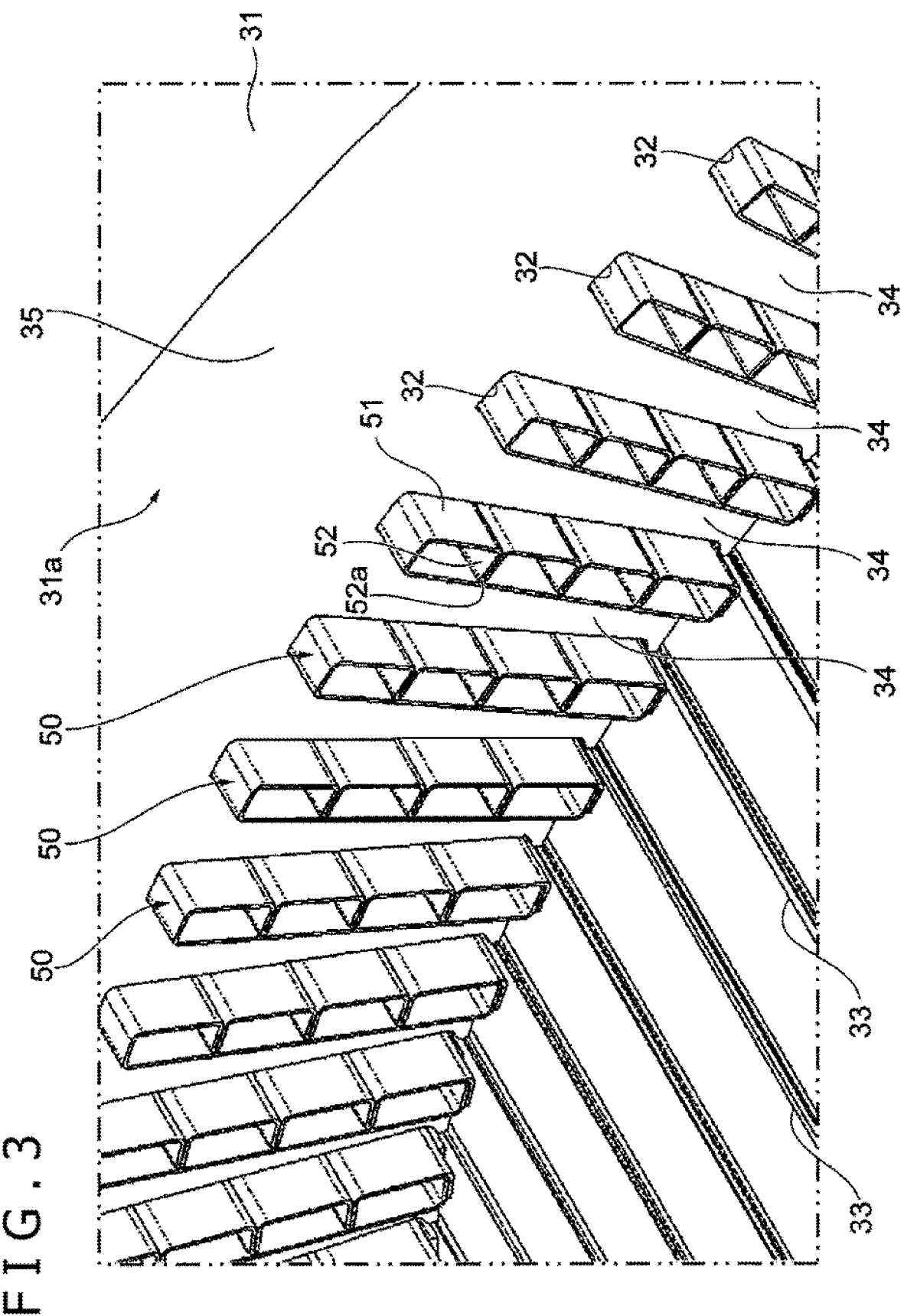
FIG. 3 is an enlarged view of part III illustrated in FIG. 2.

FIG. 2 is a perspective view of the stator 30 of the rotating electrical machine 100 illustrated in FIG. 1. FIG. 3 is an enlarged view of part III surrounded by a chain double-dashed line illustrated in FIG. 2. It is noted that the part III and a periphery thereof illustrated in FIG. 2 depict a state in which coils 40 and insulators 50 are cut on a level surface parallel to an end surface 31a of an iron core 31 and to a radial direction of the iron core 31, and on a level surface parallel to the axis L direction to expose part of the end surface 31a of the iron core 31. Furthermore, FIG. 3 does not depict the coils 40.

The stator 30 of the rotating electrical machine 100 according to the present embodiment mainly includes the cylindrical iron core 31, a plurality of slots 32 provided in the iron core 31, a plurality of coils 40 disposed in the slots 32, and the insulators 50 disposed around the coils 40 within the slots 32. As described later in detail, the stator 30 of the rotating electrical machine 100 according to the present embodiment is characterized in that each of the insulators 50 disposed around the coils 40 has an outer peripheral portion 51 surrounding the plurality of coils 40 and bent portions 52 each extending from the outer peripheral portion 51 between the coils 40 and folded back on a tip end 52a.

The iron core 31 of the stator 30 is configured by, for example, machining a flat rolled magnetic steel sheet at a thickness of approximately 0.05 to 1 mm by punching or etching into a predetermined shape that is generally toric and stacking the flat rolled magnetic steel sheets machined into this predetermined shape. The iron core 31 of the stator 30 has a hollow cylindrical shape and has the plurality of slots 32 provided at equiangular intervals in a circumferential direction. The iron core 31 of the stator 30 may have, for example, 72 slots 32 in the circumferential direction.

The slots 32 are provided into radially groove-like shapes along the radial direction of the iron core 31 from an inner circumference of the iron core 31, penetrate the iron core 31 in the axis L direction, and have opening portions 33 each continuous from one end surface 31a of the iron core 31 to the other end surface 31b on the inner circumference along the axis L direction. A width of each opening portion 33 in the circumferential direction of the iron core 31 can be set to, for example, a width at which the coils 40 can be inserted into the opening portion 33 in the circumferential direction of the iron core 31, and can be set to a width equal to or smaller than a width of each slot 32 in the circumferential direction of the iron core 31.

The iron core 31 of the stator 30 has a plurality of teeth 34 provided between the slots 32 and an annular core back 35 that is an outer peripheral portion 51 of the iron core 31. The plurality of teeth 34 and the core back 35 are provided integrally, and the plurality of teeth 34 extend from the core back 35 toward a center of the iron core 31 along the radial direction of the iron core 31. The rotor 20 illustrated in FIG. 1 is rotatably supported on inner sides of the plurality of teeth 34 in the radial direction of the iron core 31 of the stator 30, that is, on the inner side of the iron core 31 of the cylindrical stator 30 with a very small gap present between the rotor 20 and the iron core 31 of the stator 30.

Figure 4:
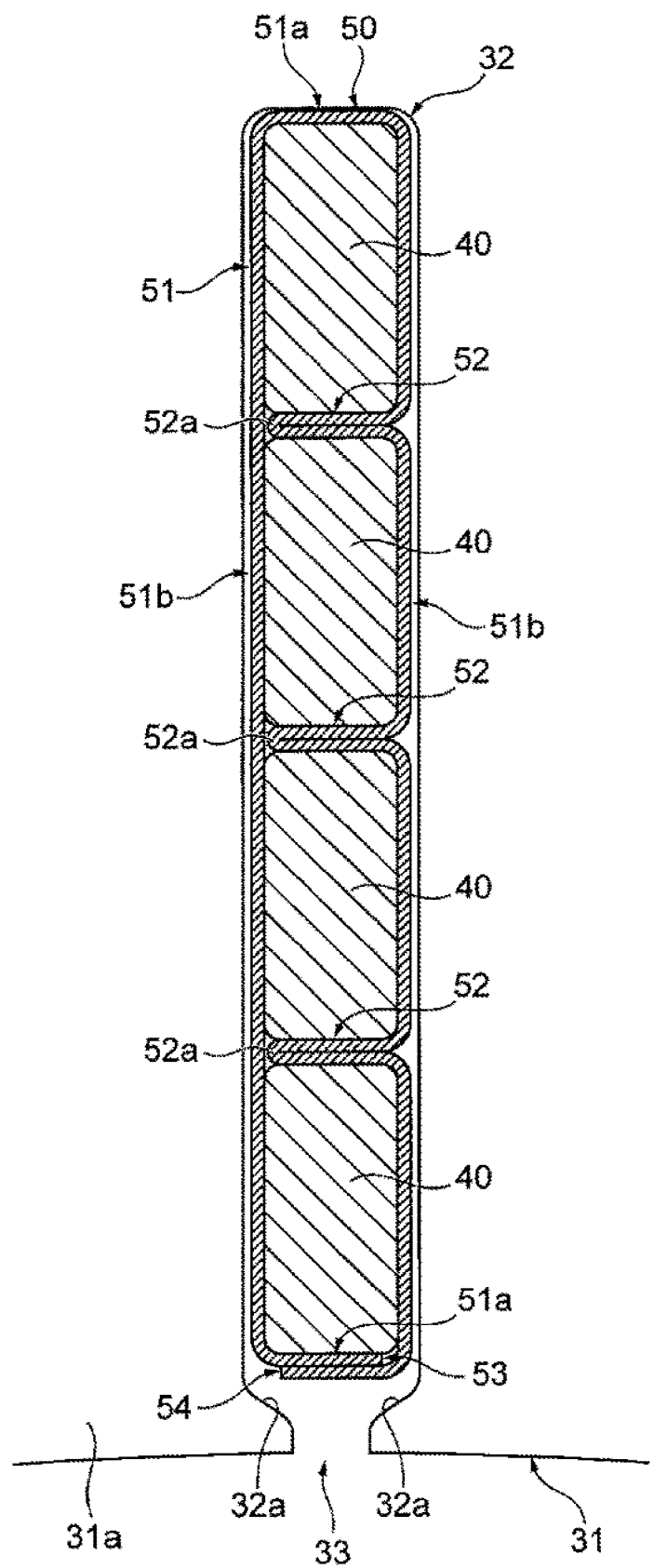
FIG. 4 is a cross-sectional view of coils and an insulator illustrated in FIG. 2.

The coils 40 are, for example, rectangular wires each having a rectangular cross-sectional shape, each have an insulating coating on an outer surface, and are disposed to align along the radial direction of the iron core 31 within each slot 32 (refer to FIG. 4). In an example of FIG. 4, each coil 40 has an oblong cross-section, and is disposed within the slot 32 in such a manner that a long side of the cross-section is generally parallel to the radial direction of the iron core 31. In the stator 30 of the rotating electrical machine 100 according to the present embodiment, for example, three-phase coils 40 are distributed windings of eight-pole 72 slots 32 and the coils 40 in each phase are connected by a star connection.

For example, one insulator 50 can be disposed in each of the slots 32 as illustrated in FIG. 3. The insulators 50 are produced by, for example, forming insulating paper to be bent. As the insulating paper, insulating paper obtained by, for example, stacking aramid paper and an insulating resin via an adhesive can be used. Examples of the available insulating resin include polyethylene terephthalate (PET), polyethylene naphthalate (PEN), polyetherimide (PEI), polyimide (PI), and polypropylene (PP). A thickness of the insulator 50 is, for example, approximately 0.1 to 0.5 mm.

FIG. 4 is a cross-sectional view of a plurality of coils 40 and the insulator 50 disposed in one slot 32 of the stator 30 of the rotating electrical machine 100 according to the present embodiment, and is a cross-sectional view along the end surface 31a of the iron core 31 of the stator 30 illustrated in FIG. 2 in the axis L direction.

The insulator 50 can be produced by one piece of insulating paper having a length such that two end portions thereof protrude from the slot 32 in the axis L direction of the iron core 31 of the stator 30, maintains an insulation distance between the iron core 31 of the stator 30 and the coils 40, and insulates the adjacent coils 40 from each other. The insulator 50 assumes a thin prismatic shape having a rectangular cross-section to correspond to the shape of the slot 32 as a whole by, for example, bending the insulating paper along the axis L direction of the iron core 31 of the stator 30 a plurality of times, and defines a plurality of rectangular and cylindrical spaces aligning in the radial direction of the iron core 31 of the stator 30. One coil 40 is inserted into each of the cylindrical spaces defined by this insulator 50.

More specifically, in the stator 30 of the rotating electrical machine 100 according to the present embodiment, the insulator 50 has the outer peripheral portion 51 surrounding the plurality of coils 40 and the bent portions 52 each extending from the outer peripheral portion 51 between the coils 40 and folded back on the tip end 52a. Further more specifically, one end portion 53 of the insulator 50 in the circumferential direction of the outer peripheral portion 51 is disposed on an inner circumferential side surface of the coil 40 disposed on an innermost circumference, opposed to the opening portion 33 of the slot 32 in the radial direction of the iron core 31 of the stator 30. The insulator 50 extends in the circumferential direction of the iron core 31 along the inner circumferential side surface of this coil 40 disposed on the innermost circumference, and is bent radially outward along a left corner portion on an inner circumferential side of this coil 40.

Furthermore, the insulator 50 extends radially outward of the iron core 31 from the left corner portion on the inner circumferential side of the coil 40 disposed on the innermost circumference to a left corner portion on an outer circumferential side of the coil 40 disposed on an outermost circumference in the radial direction of the iron core 31, along left side surfaces of the plurality of coils 40. Moreover, the insulator 50 is bent in the circumferential direction of the iron core 31 along the left corner portion on the outer circumferential side of the coil 40 disposed on the outermost circumference, extends along an outer circumferential side surface of this coil 40 disposed on the outermost circumference, and is bent radially inward of the iron core 31 along a right corner portion on the outer circumferential side of this coil 40 disposed on the outermost circumference.

Furthermore, the insulator 50 extends from the right corner portion on the outer circumferential side of the outer circumferential side coil 40 out of the two coils 40 adjacent in the radial direction of the iron core 31 to a right corner portion on an inner circumferential side of this outer circumferential side coil 40, along a right side surface of this outer circumferential side coil 40. Moreover, the insulator 50 is bent in the circumferential direction of the iron core 31 along the right corner portion on the inner circumferential side of this outer circumferential side coil 40, traverses between the two coils 40 in the circumferential direction of the iron core 31, is folded back in an opposite direction along the circumferential direction of the iron core 31, and traverses between the two coils 40 in the opposite direction. Furthermore, the insulator 50 is folded back to a radially inner side of the iron core 31 along a right corner portion on an outer circumferential side of the inner circumferential side coil 40.

As described above, the insulator 50 is inserted between the two coils 40 adjacent in the radial direction of the iron core 31 as described above. Furthermore, the insulator 50 extends radially inward of the iron core 31 from the right corner portion on the outer circumferential side of the coil 40 disposed on the outermost circumference to the right corner portion on the inner circumferential side of the coil 40 disposed on the innermost circumference in the radial direction of the iron core 31, along right side surfaces of the plurality of coils 40. Moreover, the insulator 50 is bent in the circumferential direction of the iron core 31 on the inner circumferential side of the coil 40 disposed on the innermost circumference along the right corner portion.

Furthermore, the insulator 50 extends along the inner circumferential side surface of the coil 40 disposed on the innermost circumference, and the other end portion 54 of the insulator 50 in the circumferential direction of the outer peripheral portion 51 is overlaid on the one end portion 53 of the insulator 50 in the circumferential direction of the outer peripheral portion 51. In the stator 30 of the rotating electrical machine 100 according to the present embodiment, the two end portions 53 and 54 of the insulator 50 in the circumferential direction of the outer peripheral portion 51 overlap each other at positions at which the end portions 53 and 54 are opposed, in the radial direction of the iron core 31, to wall surfaces 32*a* on two sides of the opening portion 33 of the slot 32 in the circumferential direction of the iron core 31 of the stator 30. The insulator 50 thereby covers generally entirely outer circumferential surfaces of all the coils 40 within the slot 32 with the outer peripheral portion 51 and the bent portions 52.

The outer peripheral portion 51 of the insulator 50 surrounds outer circumferences of the plurality of coils 40, for example, aligning in the radial direction of the iron core 31. In other words, the outer peripheral portion 51 has a pair of circumferential extension portions 51*a* along the inner circumferential side surface of the coil 40 disposed on the innermost circumference and the outer circumferential side surface of the coil 40 disposed on the outermost circumference, and a pair of radial extension portions 51*b* along the left and right side surfaces of the plurality of coils 40. In other words, the outer peripheral portion 51 has the pair of radial extension portions 51*b* disposed on both sides of the plurality of coils 40 in the circumferential direction of the iron core 31 and extending in the radial direction of the iron core 31, and the pair of circumferential extension portions 51*a* disposed on both sides of the plurality of coils 40 in the radial direction of the iron core 31 and extending in the circumferential direction of the iron core 31.

Each of the bent portions 52 of the insulator 50 extends from the outer peripheral portion 51 between the coils 40 and is folded back on the tip end 52*a*. Furthermore, in the stator 30 of the rotating electrical machine 100 according to the present embodiment, each of the bent portions 52 traverses between the coils 40 from one of the radial extension portion 51*b* to the other radial extension portion 51*b* out of the pair of radial extension portions 51*b* of the outer peripheral portion 51. While it is preferable that each of the bent portions 52 extends from one of the radial extension portion 51*b* of the outer peripheral portion 51 and the tip end 52*a* contacts the other radial extension portion 51*b*, a gap may be present between the tip end 52*a* and the other radial extension portion 51*b*. In this case, it is preferable that the tip end 52*a* of the bent portion 52 traverses between the two coils 40 and reaches a gap between R-shaped corner portions of the two coils 40.

Functions of the stator 30 of the rotating electrical machine 100 according to the present embodiment will be described below.

As described above, the stator 30 of the rotating electrical machine 100 according to the present embodiment has the slots 32, the plurality of coils 40 disposed in each of the slots 32, and the insulator 50 disposed around the coils 40 within each slot 32. Furthermore, the insulator 50 has the outer peripheral portion 51 surrounding the plurality of coils 40, and the bent portions 52 extending from the outer peripheral portion 51 between the coils 40 and folded back on the tip end 52*a*. Owing to this, as illustrated in FIGS. 3 and 4, disposing the insulator 50 configured simply by being formed by, for example, bending sheet-like insulating paper in each slot 32 makes it possible to define the plurality of cylindrical spaces stable in shape by the bent portions 52 stable in shape by being folded back and the outer peripheral portion 51 around the bent portions 52.

More specifically, the insulator 50 has the outer peripheral portion 51 that defines a flat cylindrical outer shape having an elongated oblong cross-section, and the bent portions 52 that partition the cylindrical space defined by the outer peripheral portion 51 into the plurality of rectangular cylindrical spaces in the radial direction of the iron core 31 of the stator 30.

Furthermore, each bent portion 52 extends in the circumferential direction of the iron core 31 of the stator 30 in a state in which the insulator 50 is folded back and doubled on the tip end 52, and the doubled insulators 50 are continuous with the outer peripheral portion 51 extending radially inward and outward of the iron core 31 on a base end of the bent portion 52, respectively.

With such a configuration, rigidity of the bent portions 52 against forces acting in the radial direction, circumferential direction, and axis L direction of the iron core 31 of the stator 30 improves, thus suppressing deformations and displacements of the bent portions 52 in the radial direction, circumferential direction, and axis L direction of the iron core 31 of the stator 30. Furthermore, the outer peripheral portion 51 is reinforced by the plurality of bent portions 52, thus suppressing a deformation and a displacement of the outer peripheral portion 51 in the radial direction, circumferential direction, and axis L direction of the iron core 31 of the stator 30. It is, therefore, possible to define the plurality of cylindrical spaces stable in shape by the bent portions 52 and the outer peripheral portion 51 around the bent portions 52 of the insulator 50.

In addition, the plurality of coils 40 can be easily inserted into the plurality of cylindrical spaces stable in shape of the insulator 50 from the axis L direction of the iron core 31 of the stator 30. It is thereby possible to cover generally entirely the outer circumferential surfaces of the coils 40 within each slot 32 with the insulator 50, and to easily insulate the slot 32 from the coils 40 and insulate coils 40 from each other by the insulator 50. According to the stator 30 of the rotating electrical machine 100 of the present embodiment, therefore, it is possible to provide the stator 30 of the rotating electrical machine 100 that can simplify component configurations, facilitate manufacturing, and realize productivity growth, compared with the conventional technique.

Furthermore, disposing the coils 40 within each slot 32 in a state of disposing the insulator 50 within the slot 32 makes it possible to prevent the coils 40 from contacting the slot 32 and being damaged and to further ensure the prevention of malfunctions such as a short-circuit and a ground fault. Moreover, folding back the insulator 50 on the tip end 52a of each bent portion 52 disposed between the coils 40 and disposing the insulator 50 between the coils 40 in the state of being doubled make it possible to further ensure that the adjacent coils 40 are insulated from each other. Further, it is possible to secure a creepage distance for insulation of the insulator 50 between the coils 40 adjacent to each other within each slot 32 and different in phase and to improve an insulation property. It is noted that a length from the base end of each bent portion 52 to the tip end 52a can be adjusted depending on a voltage of the coils 40.

Furthermore, preventing the outer peripheral portion 51 of the insulator 50 disposed on the wall surface of the slot 32 and between the plurality of coils 40 from being doubled as much as possible makes it possible to increase a space factor of the coils 40. Moreover, doubling the insulator 50 in the bent portion 52 disposed between the coils 40 makes it possible to improve the insulating property between the coils 40. For example, a working voltage of the rotating electrical machine 100 mounted in a vehicle often exceeds 100 V and a voltage equal to or higher than 600 V is applied to the coils 40 according to circumstances. For that reason, improving the insulating property between the coils 40 is quite significant.

Furthermore, in the stator 30 of the rotating electrical machine 100 according to the present embodiment, the two end portions 53 and 54 of the insulator 50 in the circumferential direction of the outer peripheral portion 51 overlap each other at the positions at which the end portions 53 and 54 are opposed to the wall surfaces 32a of the slot 32 as illustrated in FIG. 4. This can facilitate controlling directions of the end portions 53 and 54 of the insulator 50. Therefore, it is possible to stabilize shapes of the cylindrical spaces defined by the insulator 50 and further ensure that interference between the insulator 50 and the coils 40 is prevented during insertion of the coils 40, compared with a case in which the end portions 53 and 54 of the insulator 50 in the circumferential direction of the outer peripheral portion 51 are located between the coils 40. It is noted that the positions of the two end portions 53 and 54 of the insulator 50 in the circumferential direction of the outer peripheral portion 51 are not limited to those at which the end portions 53 and 54 are opposed to the wall surfaces 32a of the slot 32 radially inward of the iron core 31 of the stator 30.

Figure 5:
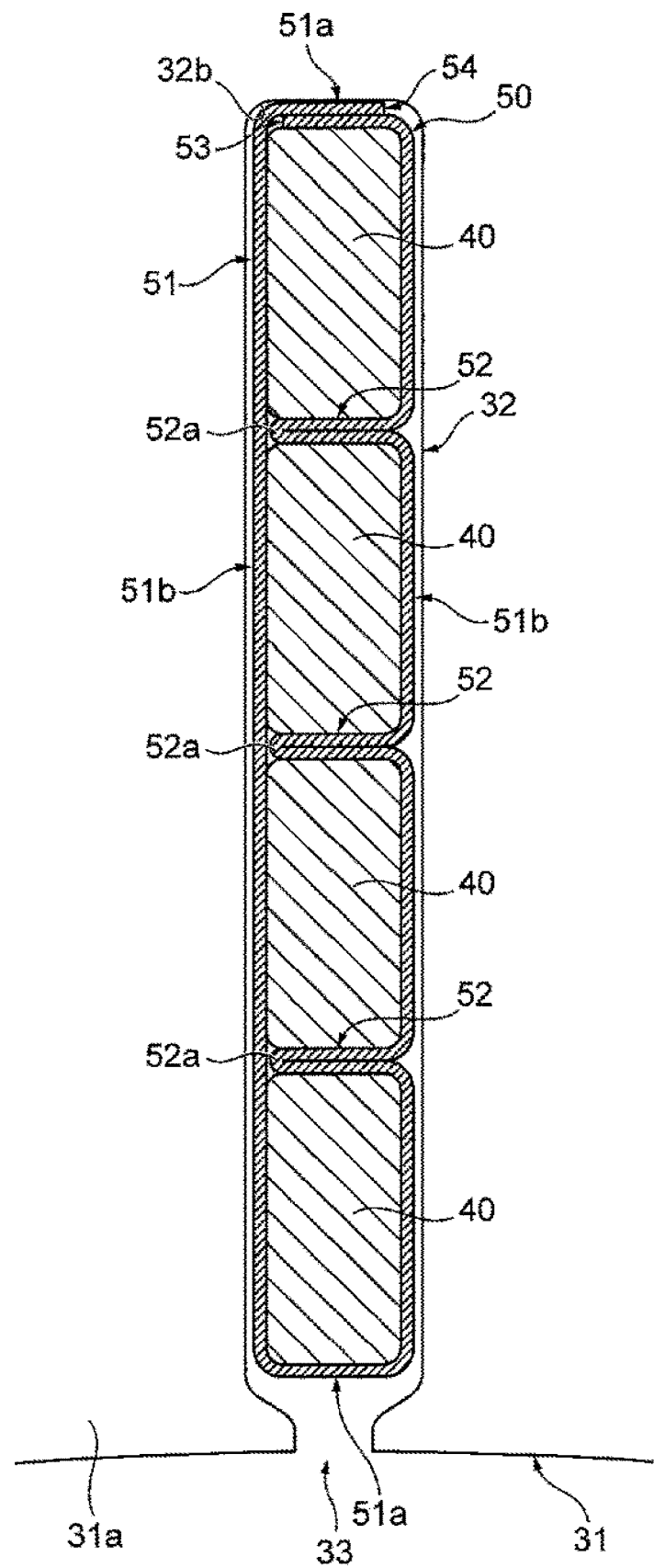
FIG. 5 is a cross-sectional view illustrating a first modification of the insulator illustrated in FIG. 4.
Figure 6:
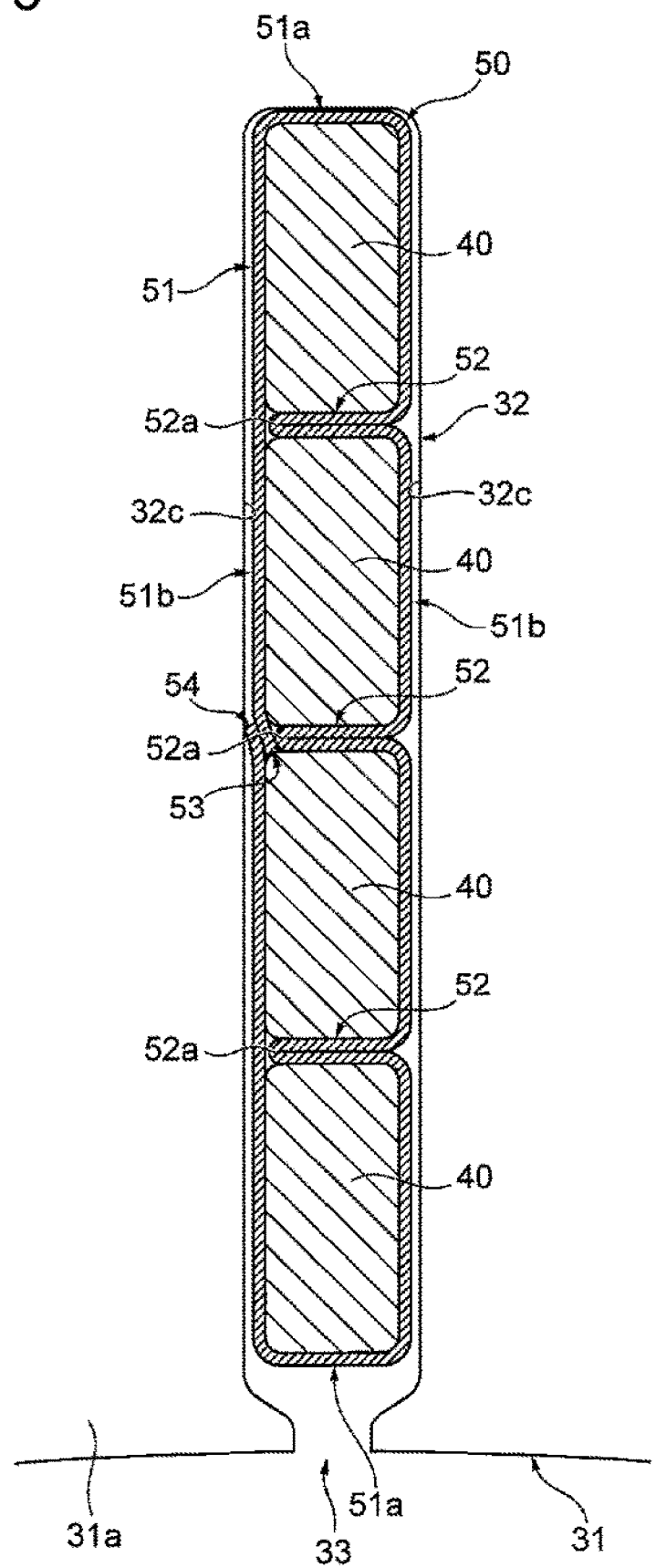
FIG. 6 is a cross-sectional view illustrating a second modification of the insulator illustrated in FIG. 4.

FIGS. 5 and 6 are cross-sectional views illustrating first and second modifications of the insulator 50 illustrated in FIG. 4, respectively.

In the first modification illustrated in FIG. 5, the two end portions 53 and 54 of the insulator 50 in the circumferential direction of the outer peripheral portion 51 overlap each other at positions at which the end portions 53 and 54 are opposed to a wall surface 32b of the slot 32 radially outward of the iron core 31 of the stator 30. Furthermore, in the second modification illustrated in FIG. 6, the two end portions 53 and 54 of the insulator 50 in the circumferential direction of the outer peripheral portion 51 overlap each other at positions at which the end portions 53 and 54 are opposed to one of wall surfaces 32c of the slot 32 in the circumferential direction of the iron core 31 of the stator 30. The stator 30 of the rotating electrical machine 100 including the insulator 50 according to each of these first and second modifications can attain similar effects to those of the stator 30 of the rotating electrical machine 100 according to the present embodiment.

Furthermore, the stator 30 of the rotating electrical machine 100 according to the present embodiment includes the cylindrical iron core 31 and the slots 32 are provided along the radial direction of the iron core 31 from the inner circumference of the iron core 31. In addition, the coils 40 have a rectangular cross-sectional shape and align within each slot 32 along the radial direction of the iron core 31. This can facilitate disposing the coils 40 with respect to the iron core 31 of the stator 30 and realize the productivity growth of the stator 30. Furthermore, connecting in series the coils 40 in the same phase disposed in the adjacent slots 32 and connecting the coils 40 with the coils 40 in the same phase connected in series assumed as a unit winding make it possible to improve an electrical balance of the coils 40.

Moreover, in the stator 30 of the rotating electrical machine 100 according to the present embodiment, each bent portion 52 traverses between the coils 40 from one of the radial extension portion 51b to the other radial extension portion 51b out of the pair of radial extension portions 51b. This can ensure that the bent portion 52 is disposed between side surfaces of the two coils 40 adjacent in the radial direction of the iron core 31 of the stator 30 and further ensure that the two coils 40 are insulated from each other. It is noted that the configuration of the bent portion 52 is not limited to the configuration to traverse between the coils 40 in the same direction from one of the radial extension portions 51b to the other radial extension portion 51b.

Figure 7:
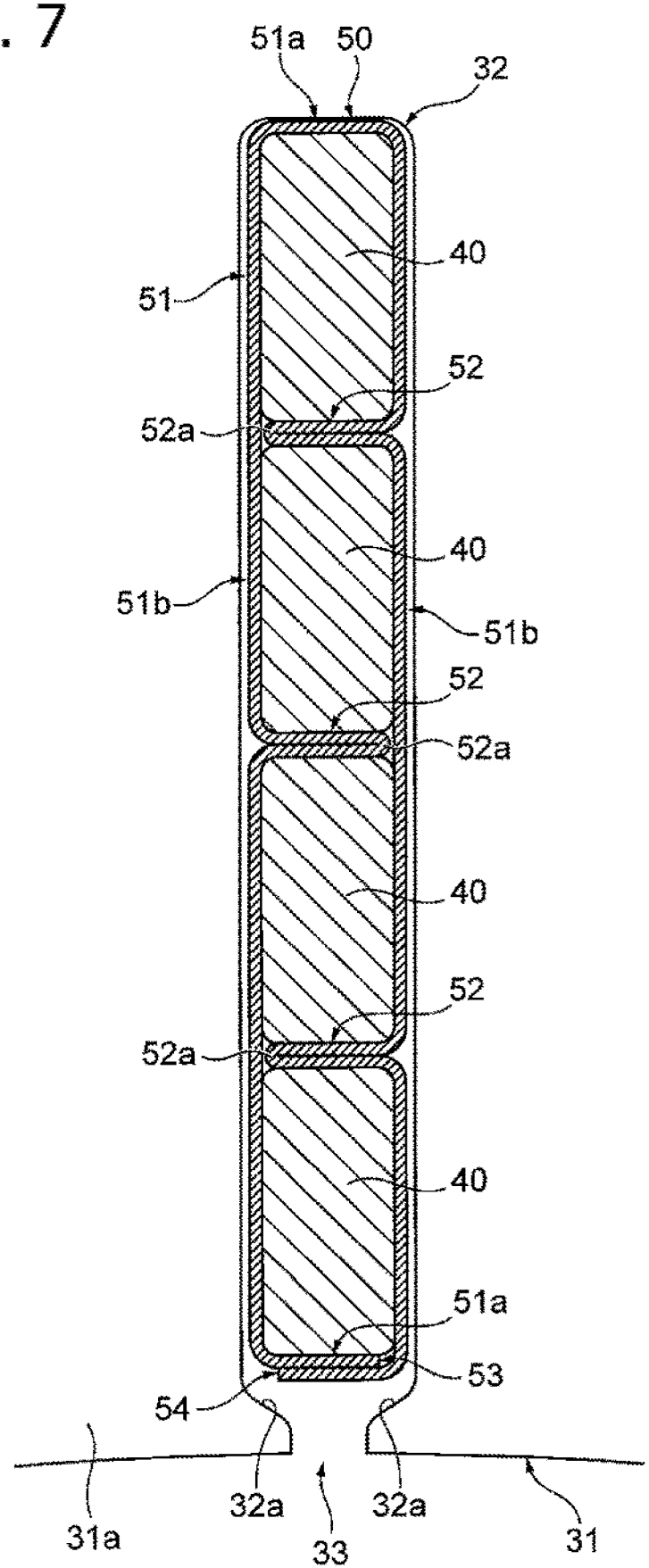
FIG. 7 is a cross-sectional view illustrating a third modification of the insulator illustrated in FIG. 4.

FIG. 7 is a cross-sectional view illustrating a third modification of the insulator 50 illustrated in FIG. 4.

In the third modification illustrated in FIG. 7, the insulator 50 alternately includes the bent portions 52 traversing between the coils 40 from one of the radial extension portions 51b to the other radial extension portion 51b out of the pair of radial extension portions 51b and the bent portions 52 traversing between the coils 40 from the other radial extension portion 51b to the one radial extension portion 51b. In other words, the bent portions 52 traverse between the coils 40 alternately in opposite directions in the radial direction of the iron core 31 of the stator 30. The stator 30 of the rotating electrical machine including the insulator 50 according to the third modification can attain similar effects to those of the stator 30 of the rotating electrical machine 100 according to the present embodiment.

As described so far, according to the stator 30 of the rotating electrical machine 100 of the present embodiment, it is possible to provide the stator 30 of the rotating electrical machine 100 that can realize the productivity growth, compared with the conventional technique while simplifying the configuration of the insulator 50. Thus, manufacturing cost of the stator 30 of the rotating electrical machine 100 can be reduced.

Second Embodiment

Figure 8:
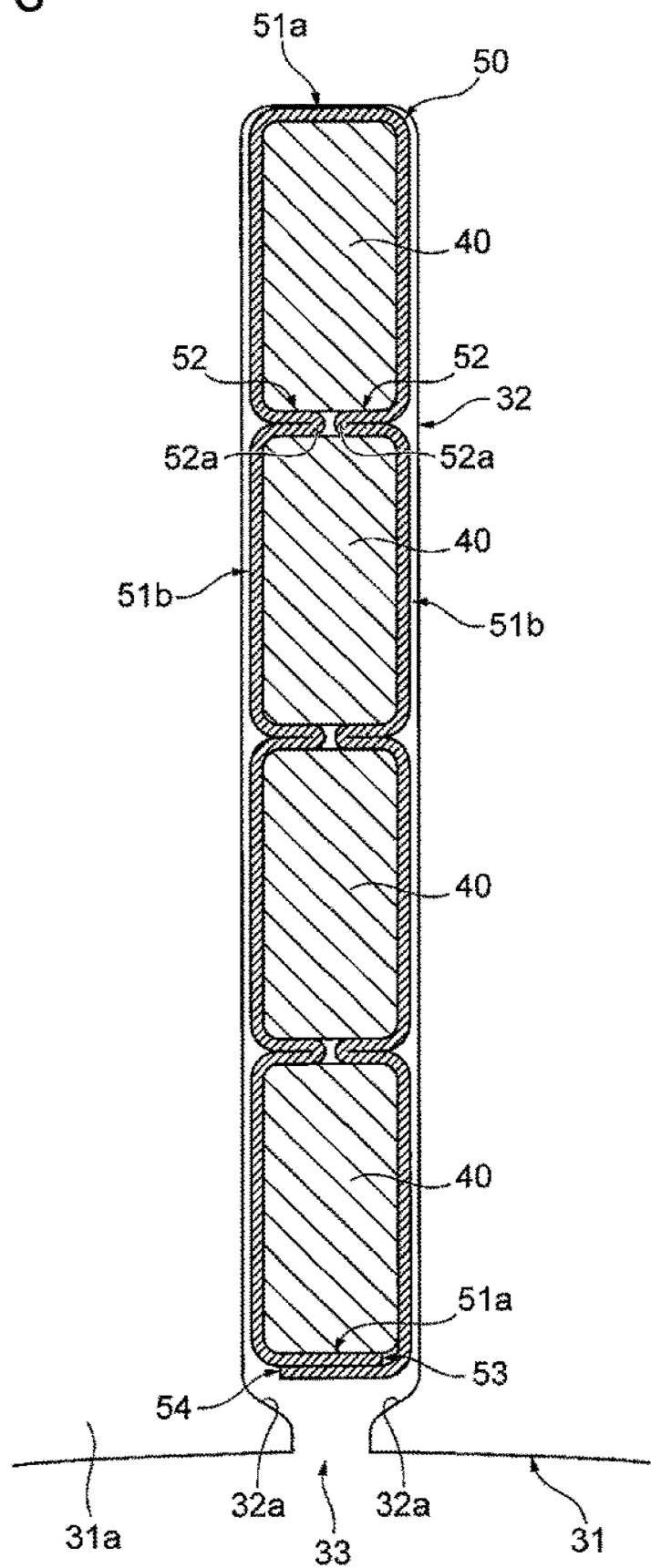
FIG. 8 is a cross-sectional view of a stator of a rotating electrical machine according to a second embodiment of the present invention and corresponds to FIG. 4.

A second embodiment of the stator of the rotating electrical machine according to the present invention will next be described with reference to FIG. 8 as well as FIGS. 1 to 3. FIG. 8 is a cross-sectional view of the stator of the rotating electrical machine according to the second embodiment of the present invention and corresponds to FIG. 4.

The stator of the rotating electrical machine according to the present embodiment differs from the stator 30 of the rotating electrical machine 100 according to the preceding first embodiment in that the bent portions 52 of the insulator 50 extend from the pair of radial extension portions 51b between the coils 40, respectively, and the tip ends 52a are opposed to each other between the coils 40. Since the other respects of the stator of the rotating electrical machine according to the present embodiment are similar to the stator 30 of the rotating electrical machine 100 according to the preceding first embodiment, similar portions are denoted by the same reference characters and description thereof will be omitted.

As illustrated in FIG. 8, in the stator of the rotating electrical machine according to the present embodiment, the bent portions 52 of the insulator 50 extend from the pair of radial extension portions 51b between the coils 40, respectively and the tip ends 52a are opposed to each other between the coils 40. While the opposed tip ends 52a of the bent portions 52 preferably contact each other, a slight gap may be present between the tip ends 52a. According to the stator of the rotating electrical machine according to the present embodiment, it is possible to not only attain similar effects to those of the stator 30 of the rotating electrical machine 100 according to the preceding first embodiment but also ensure that the corner portions of the coils 40 the insulation coatings of which tend to be relatively thin are covered with the insulator 50; thus, it is possible to further improve the insulation property and reliability.

Third Embodiment

Figure 9:
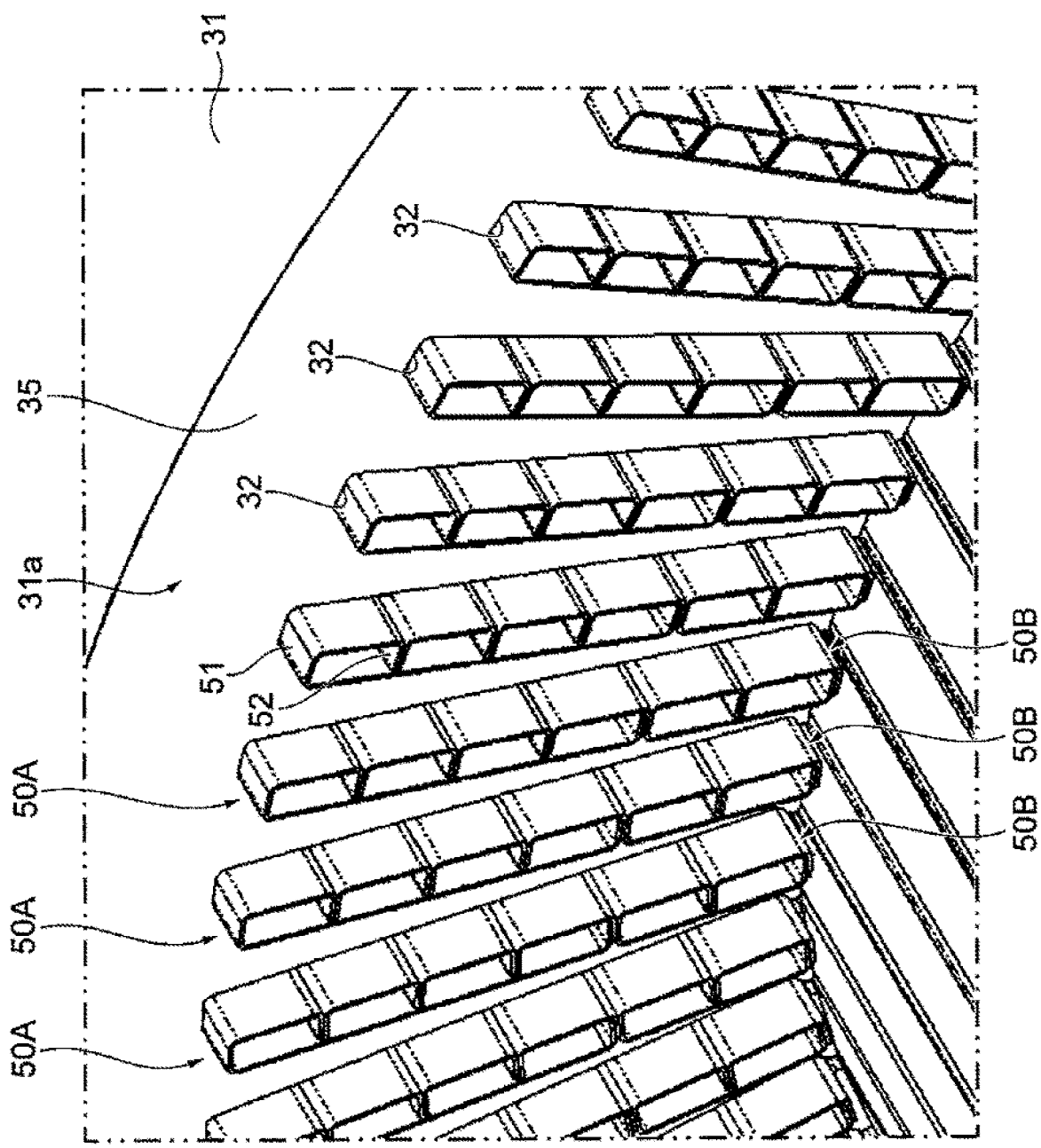
FIG. 9 is a cross-sectional view of a stator of a rotating electrical machine according to a third embodiment of the present invention and corresponds to FIG. 3.
Figure 10:
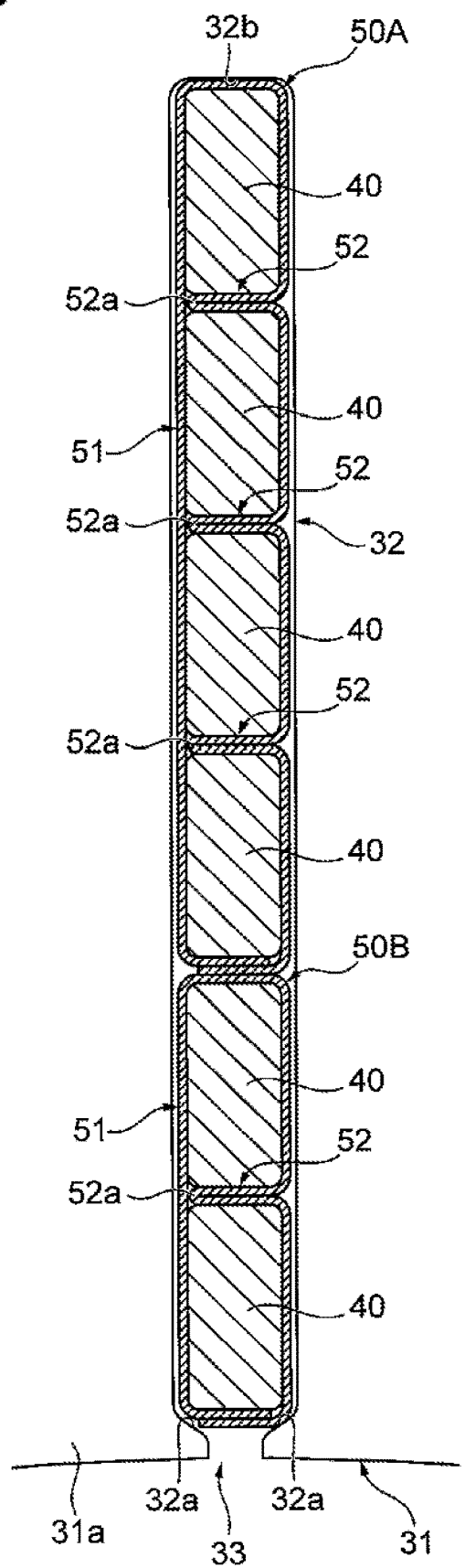
FIG. 10 is a cross-sectional view of the stator of the rotating electrical machine according to the third embodiment of the present invention and corresponds to FIG. 4.

Lastly, a third embodiment of the stator of the rotating electrical machine according to the present invention will be described with reference to FIGS. 9 and 10 as well as FIGS. 1 and 2. FIG. 9 is an enlarged view of the stator of the rotating electrical machine according to the third embodiment of the present invention and corresponds to FIG. 3. FIG. 10 is a cross-sectional view of the stator of the rotating electrical machine according to the third embodiment of the present invention and corresponds to FIG. 4.

The stator of the rotating electrical machine according to the present embodiment differs from the stator 30 of the rotating electrical machine 100 according to the preceding first embodiment in that two insulators 50A and 50B are disposed within each slot 32 in the radial direction of the iron core 31. Since the other respects of the stator of the rotating electrical machine according to the present embodiment are similar to the stator 30 of the rotating electrical machine 100 according to the preceding first embodiment, similar portions are denoted by the same reference characters and description thereof will be omitted.

As illustrated in FIGS. 9 and 10, in the stator of the rotating electrical machine according to the present embodiment, the two insulators 50A and 50B are disposed within each slot 32 in the radial direction of the iron core 31. One insulator 50B contacts the inner circumferential side wall surfaces 32a of the slot 32 in the radial direction of the iron core 31, and the other insulator 50A contacts the outer circumferential side wall surface 32b of the slot 32 in the radial direction of the iron core 31.

The one insulator 50B has the outer peripheral portion 51 surrounding the two inner circumferential side coils 40 in the radial direction of the iron core 31, and the bent portion 52 extending from the outer peripheral portion 51 between the coils 40 and folded back on the tip end 52a. The other insulator 50A has the outer peripheral portion 51 surrounding the four outer circumferential side coils 40 in the radial direction of the iron core 31, and the bent portions 52 extending from the outer peripheral portion 51 between the coils 40 and folded back on the tip ends 52a.

According to the stator of the rotating electrical machine of the present embodiment, it is possible to attain similar effects to those of the stator 30 of the rotating electrical machine 100 according to the preceding first embodiment. Furthermore, even if the number of coils 40 disposed in the radial direction of the iron core 31 of the stator increases, it is possible to suppress lengthening of a process for bending the insulators 50A and 50B during manufacturing of the insulators 50A and 50B and suppress productivity decline by using the two separate insulators 50A and 50B. Furthermore, surrounding the two or more coils 40 with the outer peripheral portion 51 of one insulator 50A or 50B makes it possible to suppress the productivity decline in a process for disposing the insulators 50A and 50B in each slot 32.

Moreover, causing one insulator 50B to contact the inner circumferential side wall surfaces 32a of the slot 32 in the radial direction of the iron core 31 and the other insulator 50A to contact the outer circumferential side wall surface 32b of the slot 32 in the radial direction of the iron core 31 makes it possible to support the insulators 50A and 50B by the wall surfaces of the slot 32 in the three directions. This can prevent a dislocation of the iron core 31 provided with the insulators 50A and 50B in the axis L direction and suppress the productivity decline in a process for inserting the coils 40 into the cylindrical spaces of the insulators 50A and 50B.

While the embodiments of the present invention have been described so far in detail with reference to the drawings, specific configurations of the present invention are not limited to the embodiments and the present invention encompasses any design change and the like without departure from the spirit of the present invention.

For example, the stator of the rotating electrical machine mounted in the vehicle such as the hybrid vehicle or the electric-powered vehicle and used as the motor or the generator has been described in the above embodiments. However, the stator of the rotating electrical machine according to the present invention is also available in a rotating electrical machine used in a drive system that starts a stopped engine of a vehicle. Furthermore, while the present invention has been described while referring to segment coils using rectangular wires as the windings as the coils in the above embodiments, the windings of the coils are not limited to the rectangular wires. Moreover, the stator of the rotating electrical machine according to the present invention is applicable to not only the permanent magnet rotating electrical machine but also an induction rotating electrical machine.

Furthermore, the rotating electrical machine that generates a rotating magnetic field in the stator by inserting the coils into many slots provided to be open on the inner circumferential side of the stator iron core and supplying an alternating-current to the coils of the stator, and that generates a rotational torque in the rotor by this rotating magnetic field has been described as the rotating electrical machine in the above embodiments. Examples of such a rotating electrical machine include an induction motor using a squirrel-cage rotor and a synchronous motor having permanent magnets in a rotor, and these motors can be also function as generators. The rotating electrical machines to which the stator according to the present invention is applicable include both of the induction motor and the synchronous motor. Examples of the induction rotating electrical machine include an induction rotating electrical machine having eight poles.

DESCRIPTION OF REFERENCE CHARACTERS

30: Stator
31: Iron core
32: Slot
32a: Wall surface
32b: Wall surface
32c: Wall surface
40: Coil
50: Insulator
50A: Insulator
50B: Insulator
51: Outer peripheral portion
51a: Circumferential extension portion
51b: Radial extension portion
52: Bent portion
52a: Tip end
53: End portion
54: End portion
100: Rotating electrical machine

The invention claimed is:

1. A stator of a rotating electrical machine comprising:
a slot;
a plurality of coils disposed within the slot in an arrangement in which the coils are stacked in an axial direction of the stator; and
an insulator disposed around the coils within the slot, wherein
the insulator has an outer peripheral portion that surrounds the plurality of coils;
the insulator has two bent portions, each of which extends from the outer peripheral portion between adjacent coils of the plurality of coils, is folded back on itself, and has a tip end, and
the tip ends of the two bent portions face each other with a gap provided between the tip ends in a central area of the coils in a circumferential direction of the stator.

2. The stator of the rotating electrical machine according to claim 1, wherein
two end portions of the insulator in a circumferential direction of the outer peripheral portion overlap each other at a position at which the end portions are opposed to a wall surface of the slot.

3. The stator of the rotating electrical machine according to claim 1, comprising
a cylindrical iron core, wherein
the slot is provided along a radial direction of the iron core from an inner circumference of the iron core, and
the coils have a rectangular cross-sectional shape and align within the slot along the radial direction of the iron core.

4. The stator of the rotating electrical machine according to claim 3, wherein
the outer peripheral portion has a pair of radial extension portions that are disposed on both sides of the plurality of coils in a circumferential direction of the iron core and that extend in the radial direction of the iron core; and a pair of circumferential extension portions that are disposed on both sides of the plurality of coils in the radial direction of the iron core and that extend in the circumferential direction of the iron core.

5. The stator of the rotating electrical machine according to claim 1, wherein
at least two of the insulators are disposed within the slot in the radial direction of the iron core, and
one of the insulators contacts an inner circumferential side wall surface of the slot in the radial direction, and other one of the insulators contacts an outer circumferential side wall surface of the slot in the radial direction.

* * * * *